United States Patent
Yang et al.

(10) Patent No.: US 11,946,845 B1
(45) Date of Patent: Apr. 2, 2024

(54) METHOD FOR DETERMINING THREE-DIMENSIONAL TORTUOSITY OF LOOSE AND BROKEN ROCK-SOIL MASS

(71) Applicant: Kunming University of Science and Technology, Kunming (CN)

(72) Inventors: Zhi-quan Yang, Kunming (CN); Jia-jun Zhang, Kunming (CN); Jun-fan Xiong, Kunming (CN); Ying-yan Zhu, Kunming (CN); Yi Yang, Kunming (CN); Muhammad Asif Khan, Kunming (CN); Tian-bing Xiang, Kunming (CN); Bi-hua Zhang, Kunming (CN); Han-hua Xu, Kunming (CN); Jie Zhang, Kunming (CN); Shen-zhang Liu, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/499,251

(22) Filed: Nov. 1, 2023

(30) Foreign Application Priority Data

Nov. 8, 2022 (CN) .......................... 202211389060.8

(51) Int. Cl.
*G01N 15/08* (2006.01)
*G01N 33/24* (2006.01)
(52) U.S. Cl.
CPC .................................. *G01N 15/08* (2013.01)
(58) Field of Classification Search
CPC .... G01N 15/00; G01N 15/08; G01N 15/0826; G01N 33/24
See application file for complete search history.

(56) References Cited

U.S. PATENT DOCUMENTS 11,193,873 B2 * 12/2021 Shin ....................... G01N 15/08

OTHER PUBLICATIONS

CNIPA, Notification of a First Office Action for CN202211389060.8, dated Jan. 19, 2023.
Sichuan Zhongde Lujiang Equipment Technology Co., Ltd and Kunming University of Science and Technology (Applicants), Reply to Notification of a First Office Action for CN202211389060.8, w/ (allowed) replacement claims, dated Feb. 2, 2023.
CNIPA, Notification to grant patent right for invention in CN202211389060.8, dated Feb. 25, 2023.

* cited by examiner

*Primary Examiner* — Nguyen Q. Ha
(74) *Attorney, Agent, or Firm* — Zhigang Ma

(57) ABSTRACT

A method for determining a three-dimensional tortuosity of a loose and broken rock-soil mass, includes the following steps: a particle grading curve of the loose and broken rock-soil mass is obtained by utilizing a particle size analysis, and followed by calculating an equivalent particle size and an average particle size; a porosity of the loose and broken rock-soil mass is obtained by utilizing a moisture content test, a density test, and a specific gravity test; the three-dimensional tortuosity of the loose and broken rock-soil mass is obtained by utilizing the equivalent particle size, the average particle size and the porosity of the loose and broken rock-soil mass. The method has the advantages of simple logic, accuracy and reliability, simple and fast parameter determination, and has high practical value and promotion value in the field of environmental protection and ecological restoration technology.

5 Claims, 4 Drawing Sheets

METHOD FOR DETERMINING THREE-DIMENSIONAL TORTUOSITY OF LOOSE AND BROKEN ROCK-SOIL MASS

TECHNICAL FIELD

The disclosure relates to the technical field of environmental protection and ecological restoration, and particularly to a method for determining a three-dimensional tortuosity of a loose and broken rock-soil mass.

BACKGROUND

As a parameter characterizing the process of fluid flowing through pore channels in porous media, tortuosity can reflect the distribution and development of the pore channels in the porous media. At present, some scholars have conducted some research on the tortuosity of the porous media, for example, Yu Boming et al. derived a geometric relationship between tortuosity and porosity by assuming that soil particles are in a square shape. LI Jianhua, Yuan Pei et al. derived a functional relationship between tortuosity and porosity characterized by fractal dimensions based on the self-similarity of Sierpinski carpet. MATYKA studied the relationship between the tortuosity and the porosity of the porous media based on Lattice Boltzmann method (LBM). Lanfrey et al. proposed a tortuosity model related to porosity under the assumption of a constant pore channel area. Li Tao analyzed a relationship between the tortuosity and pore structure of microporous media. Yan Han, Dai Shaoheng, Gan Jin et al., assuming soil particles to be square shaped and of uniform size, explored a soil tortuosity model considering effects of porosity and particle arrangement. Li Zhang et al. established a geometric tortuosity model considering the soil particle grading under the assumption that the soil particles are circular. Xue Dongjie, based on the capillary model, established a microscopic expression for tortuosity incorporating the Hagen-Poiseuille equation and Darcy's law. Rao Dengyu conducted simulation experiments on reconstructed three-dimensional soil columns using smooth particle hydrodynamics (SPH) method and obtained their diffusion tortuosity values using curve fitting. AHMADI et al. examined the arrangements of spherical particles in a three-dimensional space, specifically considering both cubic and tetrahedral arrangements. By employing the average volume method, they formulated a tortuosity model for spherical particles of equal diameter.

In addition, Chinese patent with publication No. CN109993786A discloses a method for determining tortuosity. The method includes the following steps: acquiring a pore network model of a reservoir rock and determining the linear distance between a first pore and a second pore according to first coordinate data and second coordinate data; determining a first channel set according to distribution data, screening a first channel with the shortest distance from the first channel set to serve as a second channel, determining first path tortuosity between the first and second pore according to the linear distance and the distance of the second channel, and determining the tortuosity of the reservoir rock according to the first path tortuosity set. The Chinese patent focuses on studying reservoir rocks, extracting their pore network model through image processing, and subsequently using this model to determine its tortuosity.

Moreover, Chinese patent with publication No. CN113297815A discloses a Bingham-type cement grout permeation grouting diffusion radius calculation method considering the tortuosity of a porous loose medium, and Chinese patent with publication No. CN114720331A discloses a method for determining permeability radius of columnar hemispherical grouting considering the tortuosity of rock-soil body and time-varying property of power law slurry, both of which consider the method for determining the diffusion radius only under the influence of the tortuosity of porous media, and consider it as a fixed value, without proposing a specific calculation method for tortuosity.

In conclusion, the technical methods for determining the tortuosity of rock-soil mass in the related art mainly include the following two problems.

Firstly, assuming that the rock-soil mass is the square or circular (spherical) particle, which cannot reflect the actual particle distribution characteristics of the rock-soil mass.

Secondly, the current tortuosity calculation model either contains a single index of rock-soil mass properties or are overly intricate. For example, the vast majority of tortuosity calculation models only consider the influence of porosity of the rock-soil mass, resulting in a significant difference between the theoretical value and the actual tortuosity of the rock-soil mass. On the other hand, some models are replete with multiple parameters, which are challenging to determine accurately, making them impractical for determining the tortuosity of rock and soil in applications.

It can be seen that the current methods for calculating the tortuosity of rock-soil mass cannot meet the needs of engineering practice, and cannot reasonably and effectively determine the actual three-dimensional tortuosity index of a loose and broken rock-soil mass.

Therefore, it is urgent to propose a logically simple, accurate and reliable method for determining the three-dimensional tortuosity of the loose and fractured rock-soil mass.

SUMMARY

In order to solve the problem, the disclosure provides a method for determining a three-dimensional tortuosity of a loose and broken rock-soil mass, and the technical proposal is as follows.

The method for determining the three-dimensional tortuosity of the loose and broken rock-soil mass, including steps:
a particle grading curve of the loose and broken rock-soil mass is obtained by utilizing a particle size analysis, followed by obtaining an equivalent particle size $d_{20}$ and an average particle size $d_{50}$;
a porosity $\phi$ of the loose and broken rock-soil mass is obtained by utilizing a moisture content test, a density test, and a specific gravity test; and the three-dimensional tortuosity r of the loose and broken rock-soil mass is obtained by utilizing the equivalent particle size $d_{20}$, the average particle size $d_{50}$ and the porosity $\phi$ of the loose and broken rock-soil mass. An expression of the three-dimensional tortuosity r of the loose and broken rock-soil mass is as follows:

$$\tau = \frac{A \times (1 - B^C)}{D \times E}$$

$$A = 7.42 \times 10^{-7} \sqrt{\rho_w g (1-\phi)^3} \left( 3\ln\left( \frac{43\sqrt{2}}{10^6 d_{50}} \sqrt{\frac{1-\phi}{1-0.342\phi}} \right) - \ln(\phi) \right)$$

$$B = \frac{43\sqrt{2}}{10^6 d_{50}} \sqrt{\frac{1-\phi}{1-0.342\phi}}$$

-continued $$C = 2 - \frac{\ln(\phi)}{\ln\left(\frac{43\sqrt{2}}{10^6 d_{50}}\sqrt{\frac{1-\phi}{1-0.342\phi}}\right)}$$

$$D = d_{20}\sqrt{\mu_w(1-0.342\phi)}$$

$$E = 2\ln\left(\frac{43\sqrt{2}}{10^6 d_{50}}\sqrt{\frac{1-\phi}{1-0.342\phi}}\right) - \ln\phi;$$

where $\rho_w$, represents the density of water, g represents the gravitational acceleration, $\mu_w$ represents the viscosity of water, and ln represents the logarithmic function with a base of 10.

In an embodiment, the method for determining the three-dimensional tortuosity of the loose and broken rock-soil mass further includes: providing theoretical guidance and technical reference for the environmental protection and ecological restoration engineering design of the loose and broken rock-soil mass based on the three-dimensional tortuosity r of the loose and broken rock-soil mass.

In an embodiment, the method for determining the three-dimensional tortuosity of the loose and broken rock-soil mass further includes horizontal coordinate values corresponding to a point of 20% and a point of 50% on a vertical axis of the particle grading curve of the loose and broken rock-soil mass are selected to record as the equivalent particle size $d_{20}$ and the average particle size $d_{50}$, respectively.

In an embodiment, the particle grading curve is obtained by combining a sieve analysis method with a densitometer method or a pipette method.

In an embodiment, the porosity $\phi$ of the loose and broken rock-soil mass is expressed as follows, $$\phi = 1 - \frac{\rho}{G_S \rho_W^{4° C}(1+\omega)}.$$

In the expression of the porosity $\phi$, $\rho_W^{4° C}$ represents the density of pure distilled water at 4° C.; $\rho$ represents the density of the loose and broken rock-soil mass; co represents the mass water content of the loose and broken rock-soil mass; $G_s$ represents the specific gravity of the loose and broken rock-soil mass.

In a further embodiment, the mass water content co of the loose and broken rock-soil mass is obtained by utilizing a measurement of the drying method.

In a further embodiment, the specific gravity $G_s$ of the loose and broken rock-soil mass is obtained by utilizing a measurement of a combination of the pycnometer method and the siphon tube method.

Compared with the prior art, the beneficial effects of the disclosure are as follows.

1. The disclosure addresses the shortcomings of current methods for determining the tortuosity of rock-soil mass, as well as the technical challenges faced in practical engineering. Therefore, a calculation method for determining the three-dimensional tortuosity of a loose and broken rock-soil mass is proposed, which can better reflect the actual grain size distribution characteristics, and distribution and development laws of pore channels of the loose and broken rock-soil mass.

2. The three-dimensional tortuosity of the loose and broken rock-soil mass obtained by combining the equivalent particle size, the average particle size, and the porosity is more in line with the actual situation than the tortuosity index obtained by the prior art, and can provide theoretical guidance and technical reference for the environmental protection and ecological restoration engineering design of the loose and broken rock-soil mass.

It should be noted that an actual flow of fluid in porous media (i.e., the loose and broken rock-soil mass) does not follow a straight line, but rather flows in a tortuous manner, with a typical tortuous effect. At present, tortuosity is often used to reflect the actual degree of tortuosity of fluid flow in porous media. Therefore, it is necessary to consider the tortuosity of porous media, otherwise it cannot truly reflect the actual flow situation of fluid in porous media. For example, current infiltration grouting machines assume that the diffusion channel of fluid in porous media is a straight path, but the actual flow path of slurry in porous media is tortuous, with a typical tortuous effect. Therefore, the theoretical results calculated using the current infiltration grouting mechanism are far greater than the actual values in practical grouting engineering, making it difficult to meet the needs of engineering practice.

In conclusion, the disclosure has the advantages of simple logic, accuracy and reliability, and simple and fast parameter determination to reflect the actual flow situation of fluid in the loose and broken rock-soil mass. It has high practical value and promotion value in the field of environmental protection and ecological restoration technology.

BRIEF DESCRIPTION OF DRAWINGS

In order to provide a clearer explanation of the technical solution of the embodiments of the disclosure, a brief introduction will be given to the attached drawings required in the embodiments. It should be understood that the attached drawings only illustrate certain embodiments of the disclosure, and therefore should not be regarded as limiting the scope of protection. For those skilled in the art, other relevant drawings can also be obtained based on the attached drawings without creative labor.

DETAILED DESCRIPTION OF EMBODIMENTS

In order to make the purpose, technical solution, and advantages of the disclosure clearer, the disclosure will be further explained in conjunction with the attached drawings and the embodiments. The embodiments of the disclosure include but are not limited to the following embodiments. Based on the embodiments in the disclosure, all other embodiments obtained by those skilled in the art without creative labor fall within the scope of protection in the disclosure.

In the embodiments, the term "and/or" is simply a description of the association relationship of the associated object, indicating that there can be three types of relationships, such as A and/or B, which can represent the three situations of A, A and B, and B.

The terms "first" and "second" in the specification and claims of the embodiments are used to distinguish different objects, rather than to describe a specific order of objects. For example, the first target object and the second target object are used to distinguish different target objects, rather than describing the specific order of the target objects.

In the embodiments of the disclosure, words such as "exemplary" or "for example" are used as examples, illustrations, or explanations. Any embodiments or designs described as "exemplary" or "for example" in the embodiments of the disclosure should not be construed as being more preferred or advantageous than other embodiments or designs. Specifically, the use of words such as "exemplary" or "for example" aims to present relevant concepts in a specific way.

In the description of the embodiments of the disclosure, unless otherwise specified, the meaning of "multiple" refers to two or more. For example, multiple processing units refer to two or more processing units, and multiple systems refer to two or more systems.

Embodiment 1

Figure 1:
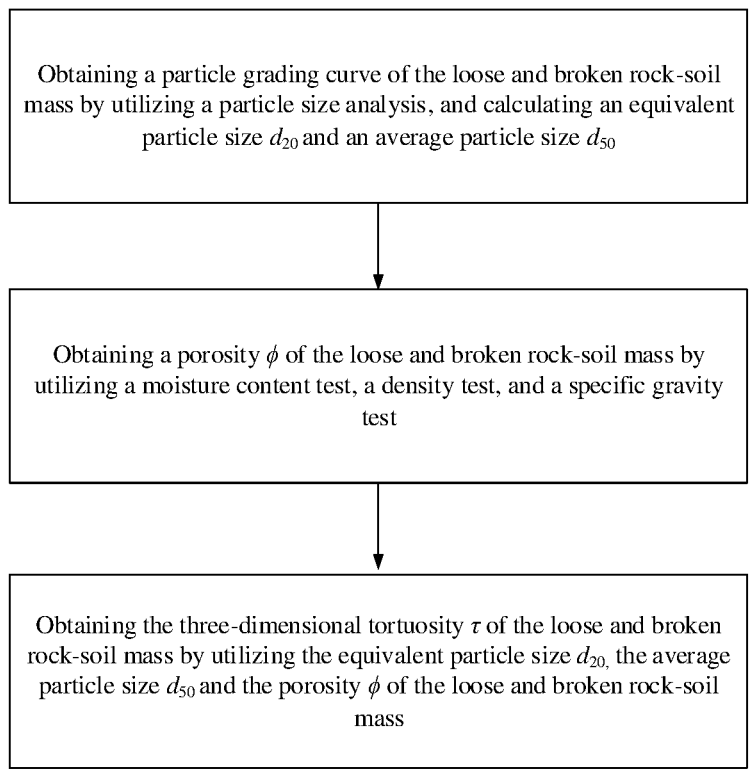
FIG. 1 illustrates a logical flowchart of the disclosure.

In an embodiment, as shown in FIG. 1, a method for determining a three-dimensional tortuosity of a loose and broken rock-soil mass includes the following steps.

Step 1, a particle grading curve of the loose and broken rock-soil mass is obtained by combining a sieve analysis method with a densitometer method or a pipette method, and followed by obtaining an equivalent particle size $d_{20}$ and an average particle size $d_{50}$. Specifically, horizontal coordinate values corresponding to a point of 20% and a point of 50% on a vertical axis of the particle grading curve of the loose and broken rock-soil mass are selected to record as the equivalent particle size $d_{20}$ and the average particle size $d_{50}$, respectively.

Step 2, a porosity $\phi$ of the loose and broken rock-soil mass is obtained by utilizing a moisture content test, a density test, and a specific gravity test. And an expression of the porosity $\phi$ of the loose and broken rock-soil mass is as follows:

$$\phi = 1 - \frac{\rho}{G_S \rho_W^{4°\,C.}(1+\omega)};$$

and $\rho_W^{4°\,C.}$ represents a density of pure distilled water at 4° C.; $\rho$ represents a density of the loose and broken rock-soil mass; $\omega$ represents a mass water content of the loose and broken rock-soil mass; $G_s$ represents a specific gravity of the loose and broken rock-soil mass. The mass water content $\omega$ of the loose and broken rock-soil mass is obtained by utilizing a measurement of a drying method. In addition, the specific gravity $G_s$ of the loose and broken rock-soil mass is obtained by utilizing a measurement of a combination of a pycnometer method and a siphon tube method.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. And an expression of the three-dimensional tortuosity $\tau$ is as follows:

$$\tau = \frac{A \times (1 - B^C)}{D \times E}$$

$$A = 7.42 \times 10^{-7} \sqrt{\rho_w g (1-\phi)^3} \left( 3\ln\left(\frac{43\sqrt{2}}{10^6 d_{50}} \sqrt{\frac{1-\phi}{1-0.342\phi}}\right) - \ln(\phi) \right)$$

$$B = \frac{43\sqrt{2}}{10^6 d_{50}} \sqrt{\frac{1-\phi}{1-0.342\phi}}$$

$$C = 2 - \frac{\ln(\phi)}{\ln\left(\frac{43\sqrt{2}}{10^6 d_{50}} \sqrt{\frac{1-\phi}{1-0.342\phi}}\right)}$$

$$D = d_{20} \sqrt{\mu_w (1-0.342\phi)}$$

and $\rho_w$ represents a density of water, g represents a gravitational acceleration, represents a viscosity of water and ln represents a logarithmic function with a base of 10.

Embodiment 2

Figure 2:
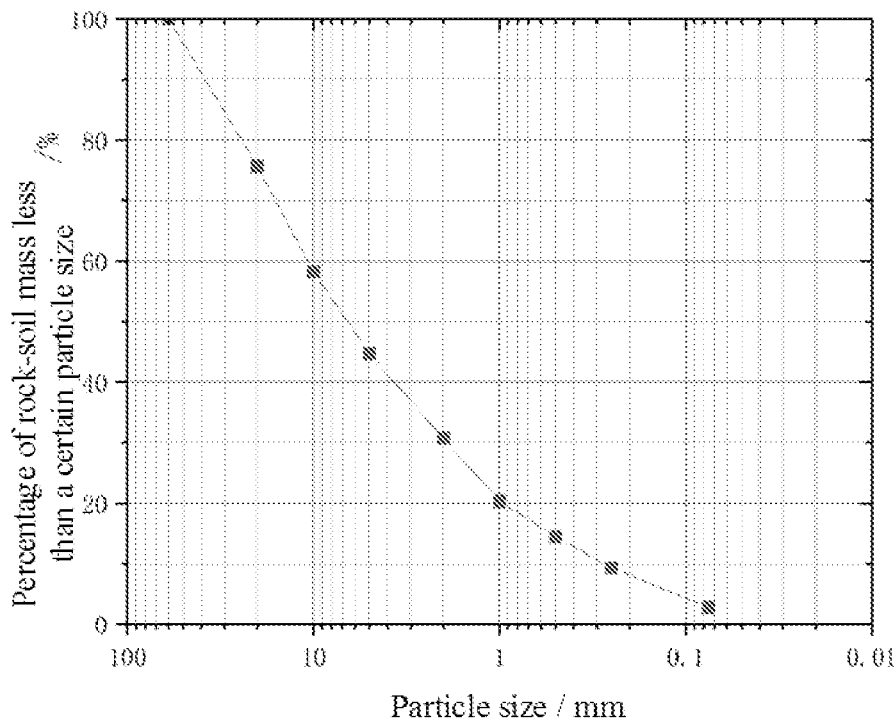
FIG. 2 illustrates a particle grading curve of the loose and broken rock-soil mass of the embodiments 2-4 in the disclosure.

In an embodiment, as shown in FIG. 2, the method for determining the three-dimensional tortuosity of the loose and broken rock-soil mass includes the following steps.

Step 1, a particle grading curve of the loose and broken rock-soil mass is obtained by utilizing a particle size analysis, and followed by obtaining the equivalent particle size $d_{20}$=millimeter (mm) and the average particle size $d_{50}$=6.83 mm.

Step 2, a porosity $\phi$ of the loose and broken rock-soil mass is obtained by utilizing a moisture content test, a density test, and a specific gravity test, and followed by obtaining a porosity $\phi$=36.04%. In the expression of the porosity $\phi$ of the loose and broken rock-soil mass, a value of $\rho_W^{4°\,C.}$ is taken as 1000 kilograms per cubic meter (kg/m³). Moreover, according to the density test, the moisture content test, and the specific gravity test, the density p of the loose and broken rock-soil mass is 1830 kg/m³, the mass water content $\omega$ of the loose and broken rock-soil mass is 6.37%, and the specific gravity $G_s$ of the loose and broken rock-soil mass is 2.69.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. A value of $\rho_w$ is taken as 1000 kg/m³, A value of g is taken as 9.8 meters per square second (m/s²), and a value of $\mu_w$ is taken as 1.52×10⁻³ pascal second (Pa·s). Through the above steps, the three-dimensional tortuosity $\tau$ of the loose and broken rock-soil mass in this embodiment is determined to be 1.65.

Embodiment 3

In an embodiment, as shown in FIG. 2, the method for determining the three-dimensional tortuosity of the loose and broken rock-soil mass includes the following steps.

Step 1, a particle grading curve of the loose and broken rock-soil mass is obtained by utilizing a particle size analysis, and followed by obtaining the equivalent particle size $d_{20}$=0.97 mm and the average particle size $d_{50}$=6.83 mm.

Step 2, a porosity $\phi$ of the loose and broken rock-soil mass is obtained by utilizing a moisture content test, a density test, and a specific gravity test, and followed by obtaining the porosity $\phi=43.13\%$. Parameters in the expression of the porosity $\phi$ of the loose and broken rock-soil mass are as follows, the density p of the loose and broken rock-soil mass is 1628 kg/m³, the mass water content $\omega$ of the loose and broken rock-soil mass is 6.42%, and the specific gravity $G_s$ of the loose and broken rock-soil mass is 2.69.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. The three-dimensional tortuosity $\tau$ of the loose and broken rock-soil mass in this embodiment is determined to be 1.39.

Embodiment 4

In an embodiment, as shown in FIG. 2, the method for determining the three-dimensional tortuosity of the loose and broken rock-soil mass includes the following steps.

Step 1, a particle grading curve of the loose and broken rock-soil mass is obtained by utilizing a particle size analysis, and followed by obtaining the equivalent particle size $d_{20}=$mm and the average particle size $d_{50}=6.83$ mm.

Step 2, a porosity $\phi$ of the loose and broken rock-soil mass is obtained by utilizing a moisture content test, a density test, and a specific gravity test, and followed by obtaining the porosity $\phi=32.73\%$. The parameters in the expression of the porosity $\phi$ of the loose and broken rock-soil mass are as follows, the density p of the loose and broken rock-soil mass is 1924 kg/m³, the mass water content $\omega$ of the loose and broken rock-soil mass is 6.32%, and the specific gravity $G_s$ of the loose and broken rock-soil mass is 2.69.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. The three-dimensional tortuosity $\tau$ of the loose and broken rock-soil mass in this embodiment is determined to be 1.78.

Embodiment 5

Figure 3:
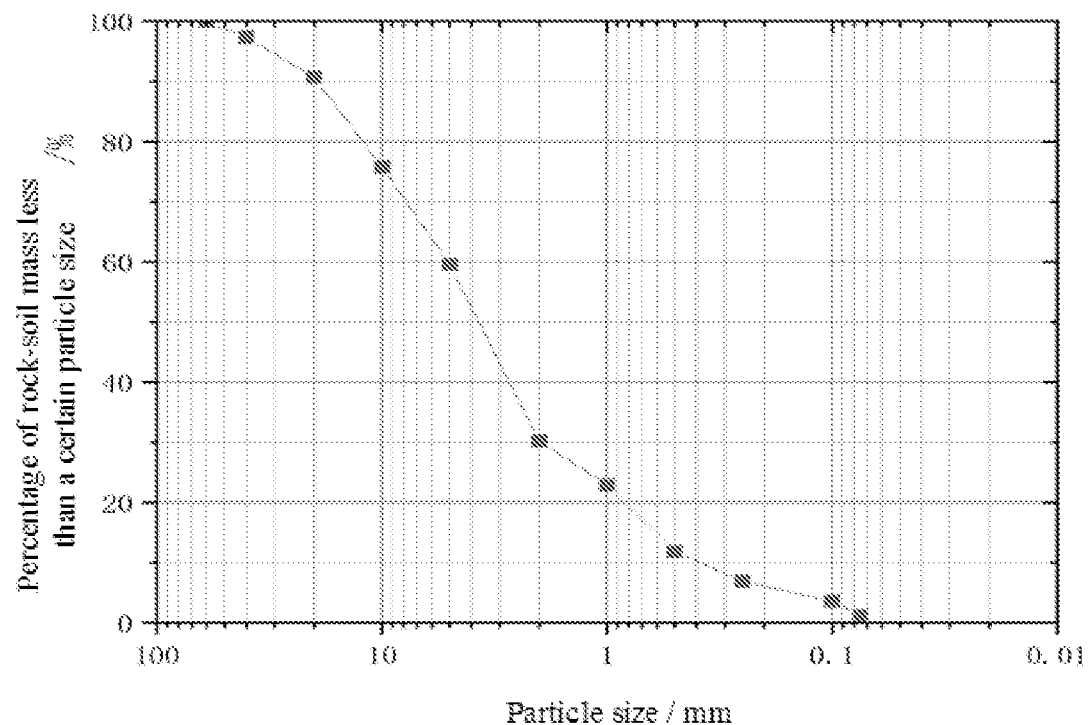
FIG. 3 illustrates a particle grading curve of the loose and broken rock-soil mass of the embodiment 5 in the disclosure.

In an embodiment, as shown in FIG. 3, the method for determining the three-dimensional tortuosity of the loose and broken rock-soil mass includes the following steps.

Step 1, a particle grading curve of the loose and broken rock-soil mass is obtained by utilizing a particle size analysis, and followed by obtaining the equivalent particle size $d_{20}=$mm and the average particle size $d_{50}=3.68$ mm.

Step 2, a porosity $\phi$ of the loose and broken rock-soil mass is obtained by utilizing a moisture content test, a density test, and a specific gravity test, and followed by obtaining a porosity $\phi=33.95\%$. The parameters in the expression of the porosity $\phi$ of the loose and broken rock-soil mass are as follows, the density p of the loose and broken rock-soil mass is 1770 kg/m³, the mass water content $\omega$ of the loose and broken rock-soil mass is 2.67%, and the specific gravity $G_s$ of the loose and broken rock-soil mass is 2.61.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. A value of $\rho_w$ is taken as 1000 kg/m³, A value of g is taken as 9.8 m/s², and a value of $\mu_w$ is taken as $1.01 \times 10^{-3}$ Pa·s. Through the above steps, the three-dimensional tortuosity $\tau$ of the loose and broken rock-soil mass in this embodiment is determined to be 2.50.

Embodiment 6

Figure 4:
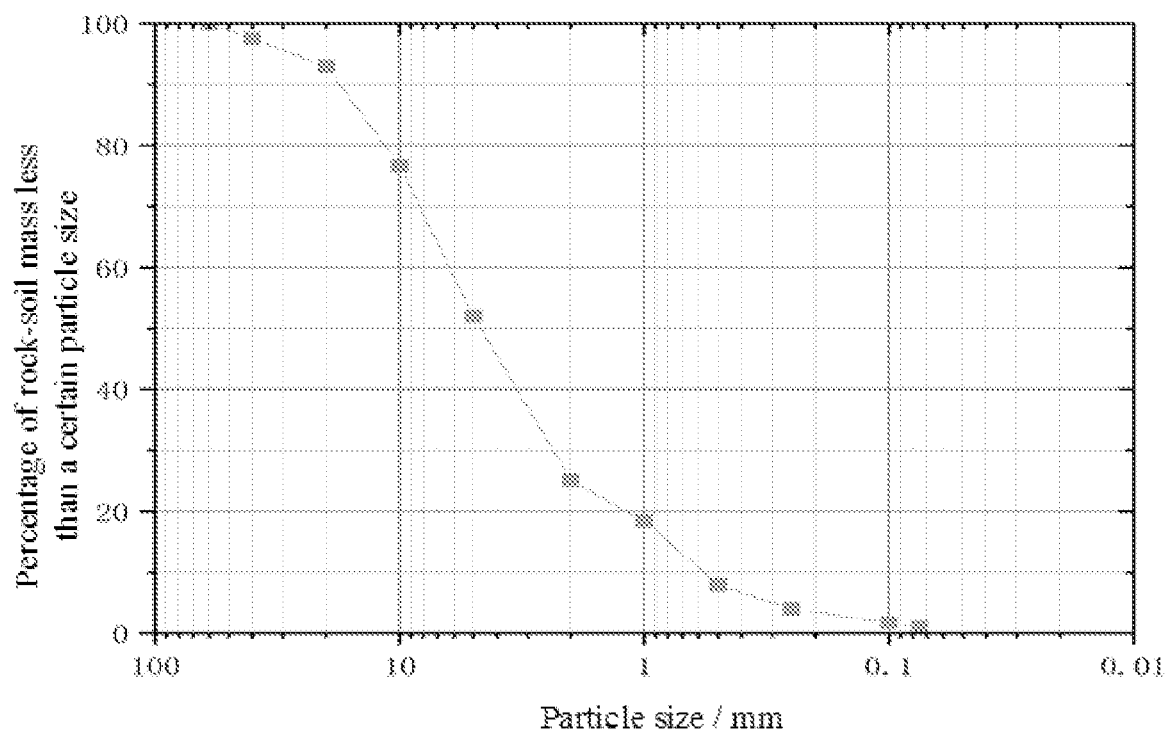
FIG. 4 illustrates a particle grading curve of the loose and broken rock-soil mass of the embodiment 6 in the disclosure.

In an embodiment, as shown in FIG. 4, the method for determining the three-dimensional tortuosity of the loose and broken rock-soil mass includes the following steps.

Step 1, a particle grading curve of the loose and broken rock-soil mass is obtained by utilizing a particle size analysis, and followed by obtaining the equivalent particle size $d_{20}=1.23$ mm and the average particle size $d_{50}=4.77$ mm.

Step 2, a porosity $\phi$ of the loose and broken rock-soil mass is obtained by utilizing a moisture content test, a density test, and a specific gravity test, and followed by obtaining the porosity $\phi=33.71\%$. The parameters in the expression of the porosity $\phi$ of the loose and broken rock-soil mass are as follows, the density p of the loose and broken rock-soil mass is 1780 kg/m³, the mass water content $\omega$ of the loose and broken rock-soil mass is 2.48%, and the specific gravity $G_s$ of the loose and broken rock-soil mass is 2.62.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. Through the above steps, the three-dimensional tortuosity $\tau$ of the loose and broken rock-soil mass in this embodiment is determined to be 1.69.

Embodiment 7

Figure 5:
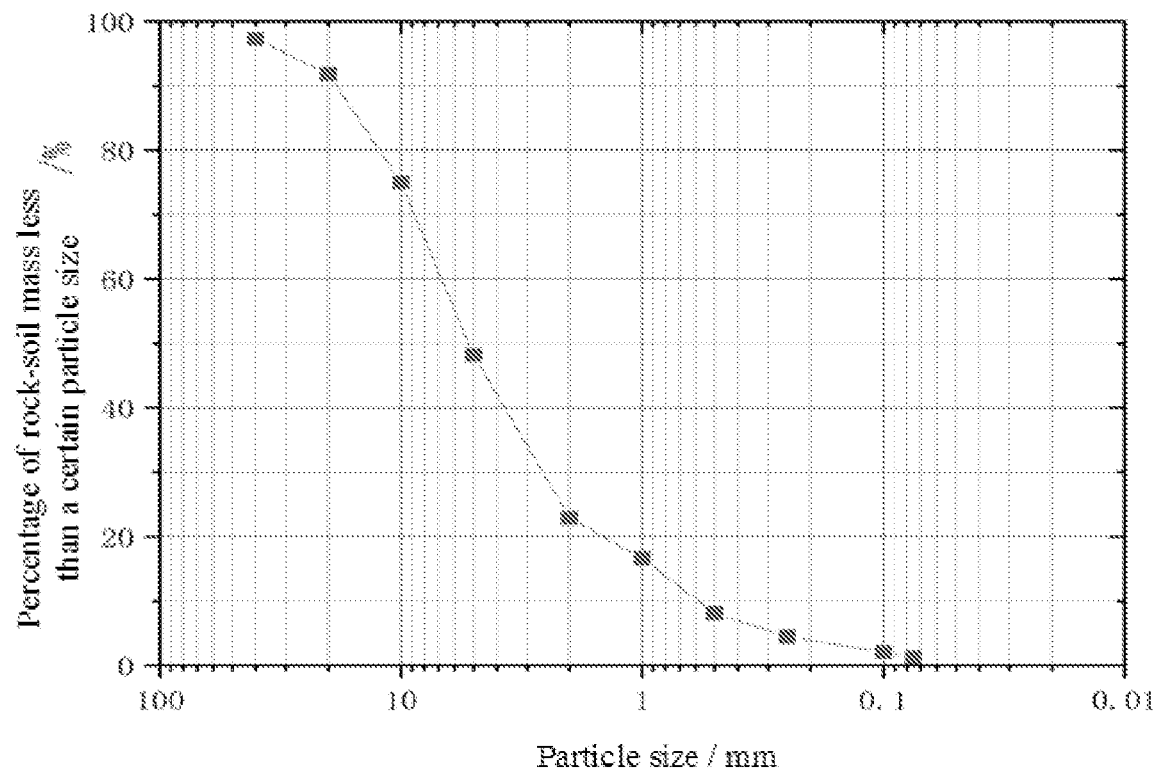
FIG. 5 illustrates a particle grading curve of the loose and broken rock-soil mass of the embodiment 7 in the disclosure.

In an embodiment, as shown in FIG. 5, the method for determining the three-dimensional tortuosity of the loose and broken rock-soil mass includes the following steps.

Step 1, a particle grading curve of the loose and broken rock-soil mass is obtained by utilizing a particle size analysis, and followed by obtaining the equivalent particle size $d_{20}=1.53$ mm and the average particle size $d_{50}=5.33$ mm.

Step 2, a porosity $\phi$ of the loose and broken rock-soil mass is obtained by utilizing a moisture content test, a density test, and a specific gravity test, and followed by obtaining the porosity $\phi=33.81\%$. The parameters in the expression of the porosity $\phi$ of the loose and broken rock-soil mass are as follows, the density p of the loose and broken rock-soil mass is 1780 kg/m³, the mass water content $\omega$ of the loose and broken rock-soil mass is 2.64%, and the specific gravity $G_s$ of the loose and broken rock-soil mass is 2.62.

Step 3, the three-dimensional tortuosity $\tau$ of the loose and broken rock-soil mass is obtained by utilizing the equivalent particle size $d_{20}$, the average particle size $d_{50}$ and the porosity $\phi$ of the loose and broken rock-soil mass. Through the above steps, the three-dimensional tortuosity $\tau$ of the loose and broken rock-soil mass in this embodiment is determined to be 1.35.

Figure 6:
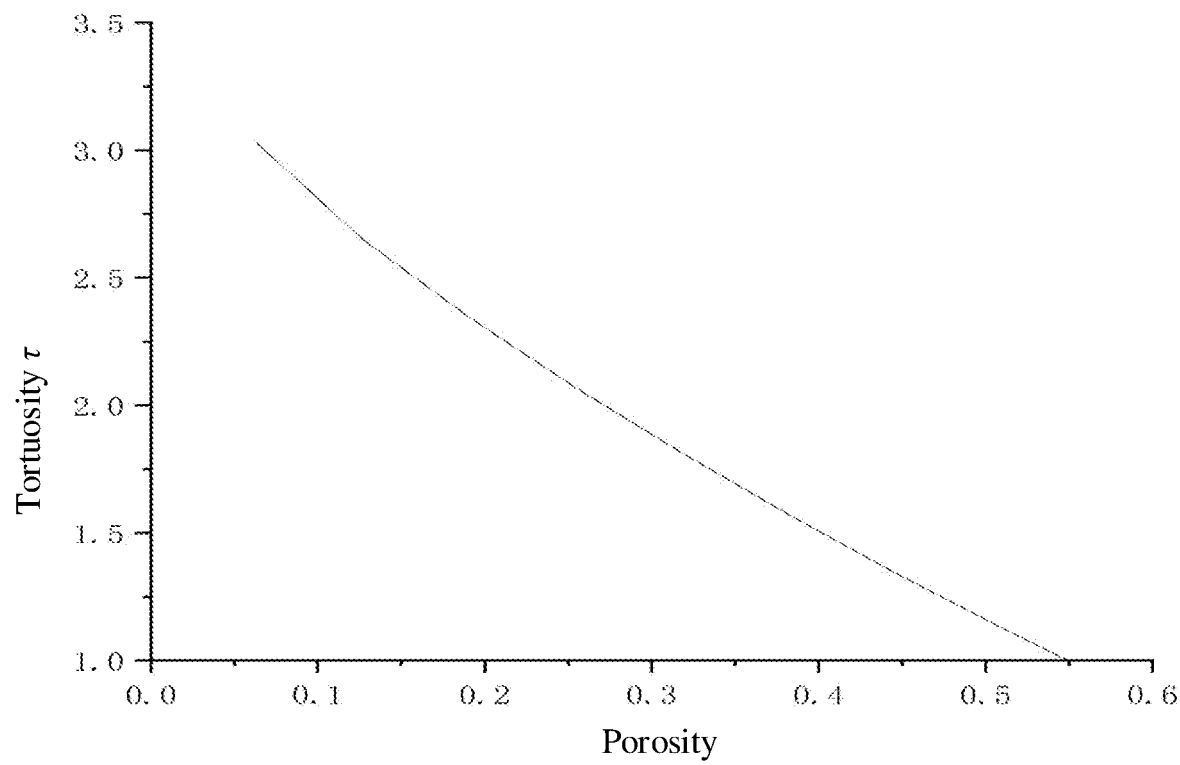
FIG. 6 illustrate a variation pattern of the three-dimensional tortuosity and the porosity of the loose and broken rock-soil mass of the disclosure.
Figure 7:
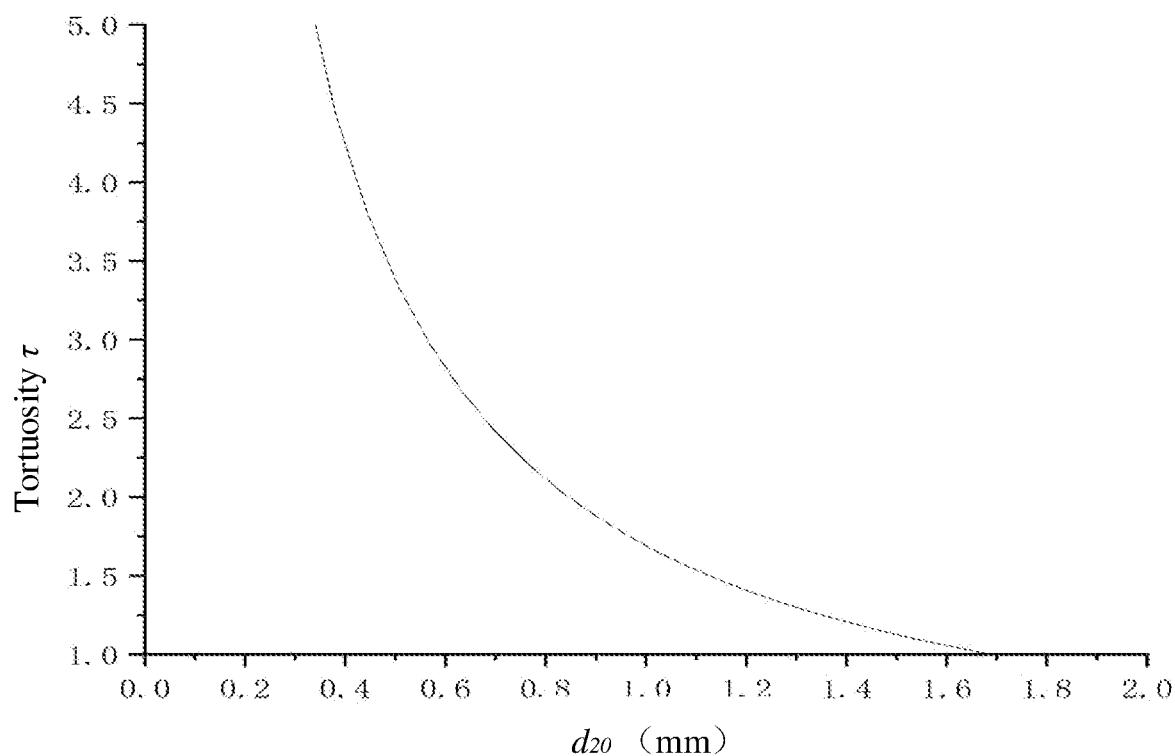
FIG. 7 illustrate a variation pattern of the three-dimensional tortuosity and the equivalent particle size of the loose and broken rock-soil mass of the disclosure.
Figure 8:
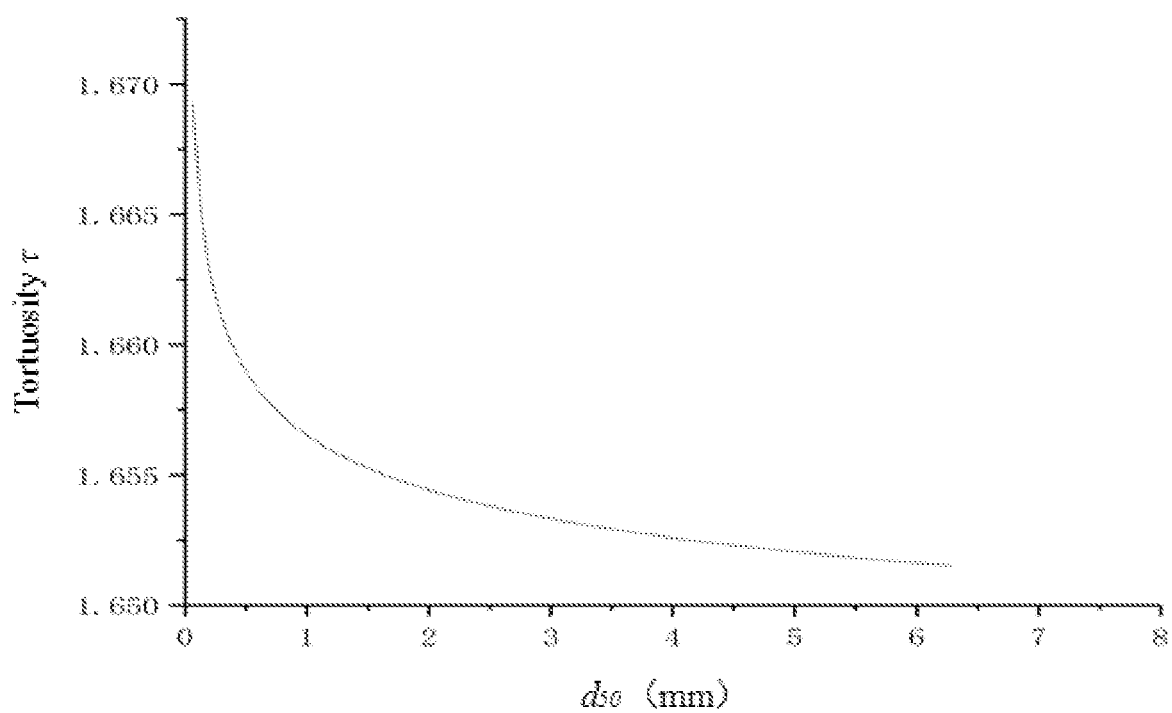
FIG. 8 illustrate a variation pattern of the three-dimensional tortuosity and the average particle size of the loose and broken rock-soil mass of the disclosure.

As shown in FIGS. 6-8, it can be seen that the three-dimensional tortuosity r of the loose and broken rock-soil mass is inversely related to the porosity $\phi$, the equivalent particle size $d_{20}$, and the average particle size $d_{50}$. That is, the larger the porosity $\phi$, the equivalent particle size $d_{20}$, and the average particle size $d_{50}$ of the loose and broken rock-soil mass, the smaller the three-dimensional tortuosity $\tau$ of the loose and broken rock-soil mass.

The above embodiments are only the preferred embodiments of the disclosure and do not limit the scope of protection of the disclosure. However, any changes made based on the design principles and non-creative labor of the disclosure should fall within the scope of protection of the disclosure.

What is claimed is:

1. A method for determining a three-dimensional tortuosity of a loose and broken rock-soil mass, comprising steps:
    obtaining a particle grading curve of the loose and broken rock-soil mass by utilizing a particle size analysis, and obtaining an equivalent particle size $d_{20}$ and an average particle size $d_{50}$; wherein the obtaining an equivalent particle size $d_{20}$ and an average particle size $d_{50}$ comprises: selecting horizontal coordinate values corresponding to a point of 20% and a point of 50% on a vertical axis of the particle grading curve of the loose and broken rock-soil mass to record as the equivalent particle size $d_{20}$ and the average particle size $d_{50}$, respectively;
    obtaining a porosity $\phi$ of the loose and broken rock-soil mass by utilizing a moisture content test, a density test, and a specific gravity test; and
    obtaining the three-dimensional tortuosity $\tau$ of the loose and broken rock-soil mass by utilizing the equivalent particle size $d_{20}$, the average particle size $d_{50}$ and the porosity $\phi$ of the loose and broken rock-soil mass; wherein the three-dimensional tortuosity $\tau$ is expressed as follows:

$$\tau = \frac{A \times (1 - B^C)}{D \times E}$$

$$A = 7.42 \times 10^{-7} \sqrt{\rho_w g (1-\phi)^3} \left( 3\ln\left( \frac{43\sqrt{2}}{10^6 d_{50}} \sqrt{\frac{1-\phi}{1-0.342\phi}} \right) - \ln(\phi) \right)$$

$$B = \frac{43\sqrt{2}}{10^6 d_{50}} \sqrt{\frac{1-\phi}{1-0.342\phi}}$$

$$C = 2 - \frac{\ln(\phi)}{\ln\left( \frac{43\sqrt{2}}{10^6 d_{50}} \sqrt{\frac{1-\phi}{1-0.342\phi}} \right)}$$

$$D = d_{20}\sqrt{\mu_w(1-0.342\phi)}$$

$$E = 2\ln\left( \frac{43\sqrt{2}}{10^6 d_{50}} \sqrt{\frac{1-\phi}{1-0.342\phi}} \right) - \ln\phi;$$

wherein $\rho_w$ represents a density of water, g represents a gravitational acceleration, $\mu_w$ represents a viscosity of water, and ln represents a logarithmic function with a base of 10.

2. The method for determining the three-dimensional tortuosity of the loose and broken rock-soil mass as claimed in claim 1, wherein the particle grading curve is obtained by combining a sieve analysis method with a densitometer method or a pipette method.

3. The method for determining the three-dimensional tortuosity of the loose and broken rock-soil mass as claimed in claim 1, wherein the porosity $\phi$ of the loose and broken rock-soil mass is expressed as follows:

$$\phi = 1 - \frac{\rho}{G_S \rho_W^{4°C} (1+\omega)};$$

wherein $\rho_W^{4°C}$ represents a density of pure distilled water at 4° C.; $\rho$ represents a density of the loose and broken rock-soil mass; $\omega$ represents a mass water content of the loose and broken rock-soil mass; $G_s$ represents a specific gravity of the loose and broken rock-soil mass.

4. The method for determining the three-dimensional tortuosity of the loose and broken rock-soil mass as claimed in claim 3, wherein the mass water content $\omega$ of the loose and broken rock-soil mass is obtained by utilizing a measurement of a drying method.

5. The method for determining the three-dimensional tortuosity of the loose and broken rock-soil mass as claimed in claim 3, wherein the specific gravity $G_s$ of the loose and broken rock-soil mass is obtained by utilizing a measurement of a combination of a pycnometer method and a siphon tube method.

* * * * *